United States Patent [19]
Ito et al.

[11] Patent Number: 6,122,515
[45] Date of Patent: Sep. 19, 2000

[54] MOBILE RADIO COMMUNICATION SYSTEM AND FIXED AND MOBILE UNITS USED THEREFOR

[75] Inventors: Koichi Ito, Støvring, Denmark; Kuniyoshi Marui, Tokorozawa, Japan; Buntaro Sawa, Sagamihara, Japan; Jun Kuno, Yachimata, Japan

[73] Assignee: Kabushiki Kaisha Toshiba, Japan

[21] Appl. No.: 08/381,994

[22] PCT Filed: Jun. 17, 1994

[86] PCT No.: PCT/JP94/00982

§ 371 Date: Feb. 15, 1995

§ 102(e) Date: Feb. 15, 1995

[87] PCT Pub. No.: WO95/01013

PCT Pub. Date: Jan. 5, 1995

[30] Foreign Application Priority Data

Jun. 17, 1993 [JP] Japan ..................................... 5-146418

[51] Int. Cl.$^7$ ...................................................... H04Q 7/20
[52] U.S. Cl. ........................... 455/450; 455/426; 455/464
[58] Field of Search .................................. 379/58, 59, 61; 455/34.1, 34.2, 426, 450, 455, 464, 553, 552, 509, 447

[56] References Cited

U.S. PATENT DOCUMENTS

| | | |
|---|---|---|
| 4,790,000 | 12/1988 | Kinoshita . |
| 4,989,230 | 1/1991 | Gillig et al. . |
| 5,073,971 | 12/1991 | Schaeffer ................................. 455/447 |
| 5,260,988 | 11/1993 | Schellinger et al. ....................... 379/59 |
| 5,428,668 | 6/1995 | Dent et al. ................................. 379/59 |
| 5,442,680 | 8/1995 | Schellinger et al. ..................... 455/426 |
| 5,722,043 | 2/1998 | Rappaport et al. ...................... 455/447 |
| 5,774,805 | 6/1998 | Zicker ...................................... 455/552 |
| 5,839,075 | 11/1998 | Haaretsen et al. ....................... 455/509 |

FOREIGN PATENT DOCUMENTS

| | | |
|---|---|---|
| 0 452 290 A1 | 10/1991 | European Pat. Off. . |
| 62-136930 | 6/1987 | Japan . |
| 3-1621 | 1/1991 | Japan . |

OTHER PUBLICATIONS

Chinese Office Action.
European Search Report.

*Primary Examiner*—Dwayne D. Bost
*Assistant Examiner*—Nay A. Maung
*Attorney, Agent, or Firm*—Banner & Witcoff, Ltd.

[57] ABSTRACT

In a mobile communication system of the present invention, a cordless base unit LBU is connected to a wired subscriber line SL. The base unit LBU detects a radio channel assigned to a cell other than a cell where the base unit LBU is located, among radio channels assigned to the cells of a cellular radio communication system. This radio channel is used as a radio channel for a cordless call. On the other hand, a cellular cordless telephone CCT is provided with a mode switch. When a cordless mode is designated by the mode switch, a radio channel for a cordless call is detected, as with the case of the base unit LBU. At the time of the cordless call, a transmission power level of the cellular cordless telephone CCT is set at a weak level smaller than that for a cellular call.

22 Claims, 10 Drawing Sheets

MOBILE RADIO COMMUNICATION SYSTEM AND FIXED AND MOBILE UNITS USED THEREFOR

TECHNICAL FIELD

The present invention relates to a mobile communication system obtained by improving a cellular type radio communication system.

BACKGROUND ART

For example, a cellular type automobile/portable radio telephone system has been known as one of mobile communication systems.

Figure 9:
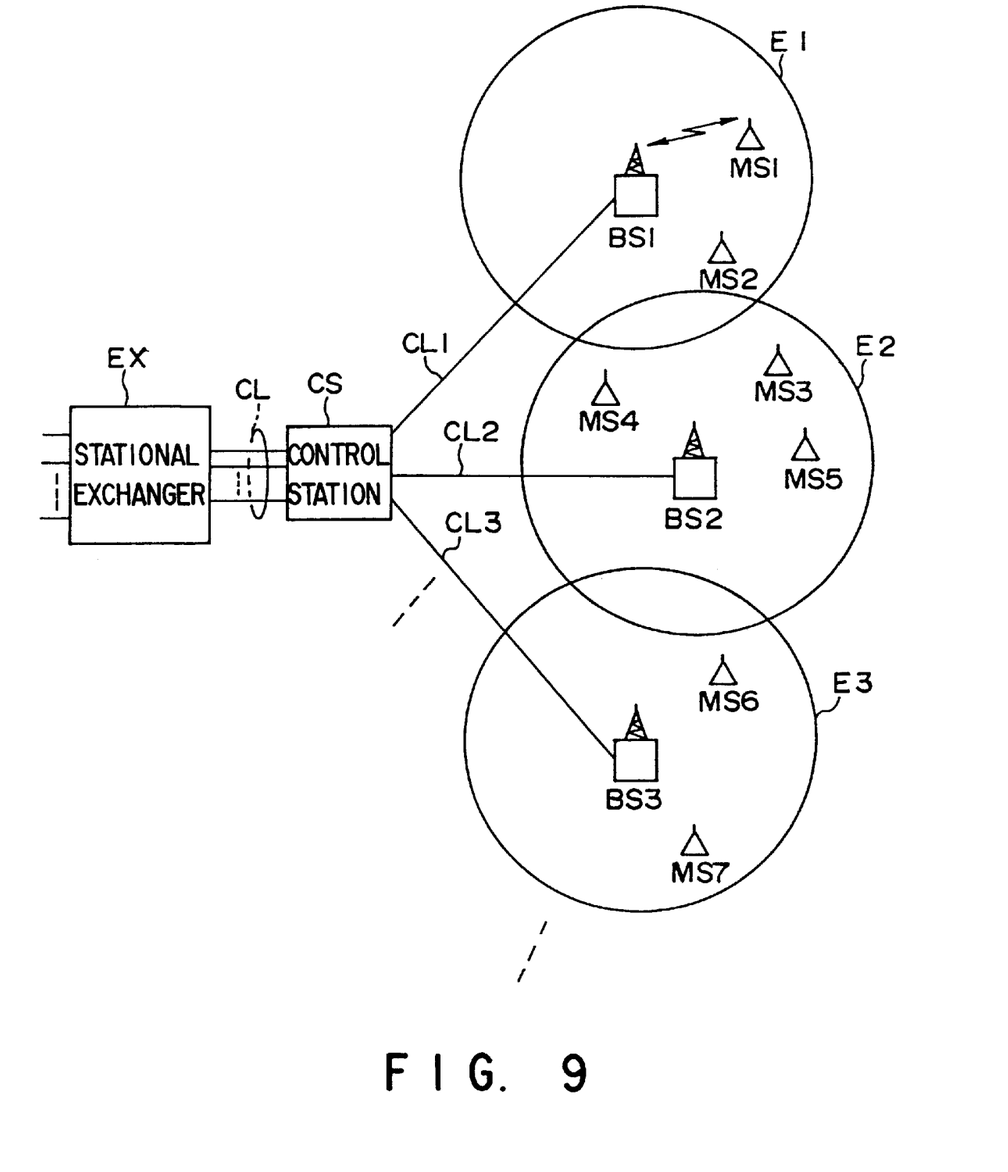
FIG. 9 shows schematically the structure of an example of a cellular radio communication system.
Figure 10:
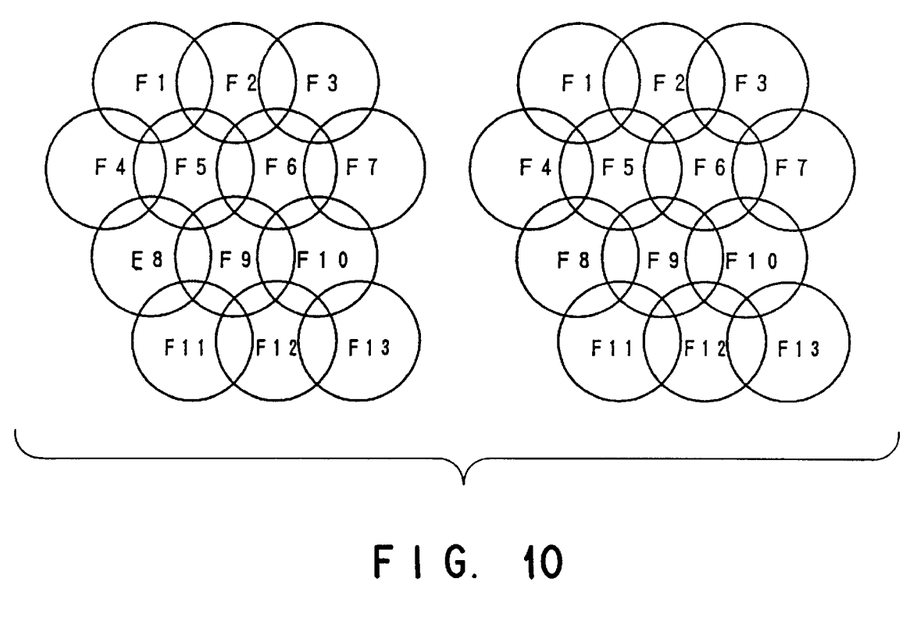
FIG. 10 shows an example of assignment of radio channels to the respective cells of the cellular radio communication system.

For example, as shown in FIG. 9, this type of system comprises a control station CS connected via a wired line CL to a stational exchanger EX of a public station network, a plurality of base stations BS1 to BSn connected via wired lines CL1 to CLn to the control station CS, and a plurality of mobile stations MS1 to MSm. The respective base stations BS1 to BSn constitute radio zones E1 to En called cells in different areas within a service area of the system. Different radio channel groups are assigned in advance to the radio zones E1 to En. These radio channel groups are repeatedly assigned to other cell groups located at a sufficient distance, thereby effectively utilizing the radio channels. FIG. 10 shows an example of this structure, and radio channel groups F1 to F13 are assigned to 13 cells constituting each cell group.

Regarding the mobile stations MS1 to MSm, each station is connected to the base station of the radio zone, in which the present station is located, via an unoccupied radio channel of the radio channel group assigned to this radio zone, and the base station is in turn connected to the stational exchanger EX via the control station CS. In this state, a call can be made with a wired telephone connected to the stational exchanger EX or another mobile station. If the mobile station, MS1 to MSm, has moved to another radio zone during a call, the radio channel is switched to a radio channel assigned to the radio zone of the destination of the mobile station and the call is continued. Specifically, as long as the mobile stations MS1 to MSm are present within the service area of the system, a call can be made between each station and another telephone via the base station of the radio zone (cell) where the station is located.

This cellular radio telephone system, however, has the following problem. In the cellular radio telephone system, a mobile station is permitted to make a call anywhere in the service area. Thus, when the user is present, in particular, outdoors, the feature of the system can be exhibited to a maximum. However, the charging rate of the call fee of the cellular radio telephone system is generally higher than that of the public telephone network using wired lines. Accordingly, when the user makes a call in the home or office, it is economical to use a wired subscriber line of the public telephone network, rather than using the cellular radio telephone system. For this purpose, however, the user must deliberately choose between the use of the mobile station of the cellular radio telephone system, i.e. the portable telephone, and the use of the wired telephone installed in the home or office, each time he makes a call. This is very troublesome.

DISCLOSURE OF INVENTION

A first object of the present invention is to provide a mobile communication system capable of performing cellular communication and cordless communication with one mobile unit.

A second object of the present invention is to provide a mobile communication system capable of more effectively utilizing a radio channel assigned to a cellular radio communication system.

A third object of the present invention is to provide a mobile communication system which does not incur an increase in size and weight of a mobile unit, does not cause a considerable increase in cost, and can be realized easily.

In order to achieve the first and second objects, the mobile communication system of the present invention comprises a cellular radio communication system and a fixed unit. In the cellular radio communication system, a predetermined physical area is divided into a plurality of cells, and radio communication is performed between a base unit provided in the cell and a mobile unit moving in the physical area. For this radio communication, the radio channel assigned to the cell where the mobile unit is located is used. The transmission output level of the mobile unit is set in a predetermined first transmission output level range. The fixed unit is connected to a public communication network via a wired subscriber line.

The fixed unit and the mobile unit comprise means for performing radio communication between these units. The radio communication means performs radio communication between the fixed unit and the mobile unit by using the radio channel which is assigned to any of the cells of the cellular radio communication system and is other than the radio channel assigned to the cell where the mobile unit is located, at a level in a second transmission output level range smaller than the first transmission output level range.

According to this structure, only by buying a mobile unit and a fixed unit for cordless communication, can the user make a cellular call, e.g. in the outdoors, with the mobile unit by making use of a cellular radio communication system. Besides, in the home or office, the user can make cordless communication by making use of the wired subscriber line. Thus, with the portability of a cellular terminal maintained, the call fee can be economically reduced. Furthermore, the user does not need to selectively use the portable telephone for the cellular radio communication system or the wired telephone installed in the home or office. Only by using a single mobile unit can the user make cellular communication or cordless communication.

In the mobile communication system of the present invention, the fixed unit comprises first receiving means, second receiving means and detection means. The second receiving means receives a signal from the mobile unit. The first receiving means selectively receives a signal sent via the radio channel assigned to each cell of the cellular radio communication system. The detection means determines whether the radio channel other than the radio channel assigned to the cell where the fixed unit is located, among the radio channels assigned to the cells of the cellular radio communication system, is available on the basis of the signal received by the first receiving means.

According to this structure, a radio channel with less interference is selected from the radio channels possessed by the cellular radio communication system, and cordless communication is performed between the mobile unit and fixed unit via the radio channel. Thus, the efficiency of use of the radio channels possessed by the cellular radio communication system can be enhanced, and there is no need to assign a new radio channel for cordless communication. Therefore, this technique can easily be practiced.

In order to achieve the third object, the mobile communication system of the present invention has one receiving means in the mobile unit. The receiving means receives, in a first time period, a signal sent via a radio channel designated by the base unit, and receives, in a second time period different from the first time period, a signal sent via the radio channel which is assigned to any of the cells of the cellular radio communication system and is other than the radio channel assigned to the cell where the mobile unit is located. Based on the signal received by the receiving means, a call coming from the base unit and a call coming from the fixed unit are detected.

According to this structure, in the mobile unit, one receiving means receives the signal from the base unit of the cellular radio communication system and the signal sent from the fixed unit in a time-sharing manner. Thus, only one receiving means may be provided. As compared to the case where, for example, the mobile unit is provided with a structure for cellular communication and a structure for cordless communication, the circuit configuration of the mobile unit can be simplified and the unit can be reduced in size and weight.

In the mobile communication system of the present invention, the mobile unit is provided with operation means. The operation means is used to designate/input the base unit or the fixed unit as a radio connection destination. Based on the designated/input result of the operation means, a radio communication operation with the base unit and a radio communication operation with the fixed unit are selectively performed.

Furthermore, in the mobile communication system of the present invention, a signal sent from the fixed unit is monitored in the mobile unit. While a signal sent from the fixed unit to the mobile unit is being received, a cordless mode is set. In the other time period, a cellular mode is set. In accordance with the set mode, a radio communication operation between the mobile unit and the base unit and a radio communication operation between the mobile unit and the fixed unit are selectively performed.

According to these structures, the mobile unit may be provided with only one transmission/reception means. Thereby, the circuit configuration of the mobile unit can be simplified and the unit can be reduced in size and weight.

On the other hand, the fixed unit of the present invention includes, in addition to wired communication means for signal transmission/reception with a public communication network via wired subscriber lines, detection means, radio communication means for radio communication with the mobile unit of the cellular radio communication system, and communication control means. The detection means detects whether the radio channel other than the radio channel assigned to the cell where the fixed unit is located, among the radio channels assigned to the cells of the cellular radio communication system, is available. Based on the detection result, the radio channel to be used by the radio communication means is selected and signal transmission/reception with the mobile unit is performed. If communication is performed between the public communication network and the mobile unit is performed, the communication control means connects the wired communication means and the radio communication means.

BEST MODE OF CARRYING OUT THE INVENTION

A mobile communication system according to an embodiment of the present invention will now be described.

The system of this embodiment is based on a cellular radio communication system to which the AMPS system prevailing in the U.S.A., etc. is applied.

A frequency band of, e.g. 824 MHz to 894 MHz is assigned to the cellular radio communication system. In this frequency band, 824 MHz to 849 MHz are used for upward channels from mobile stations to a base station, and 869 MHz to 894 MHz are used for downward channels from the base station to the mobile stations. The number of the upward channels and the number of the downward channels are, respectively, 832. The present system adopts a multi-channel access system for each cell. Of the 832 channels, 790 channels are assigned to calls, and the other 42 channels are assigned to control.

Figure 1:
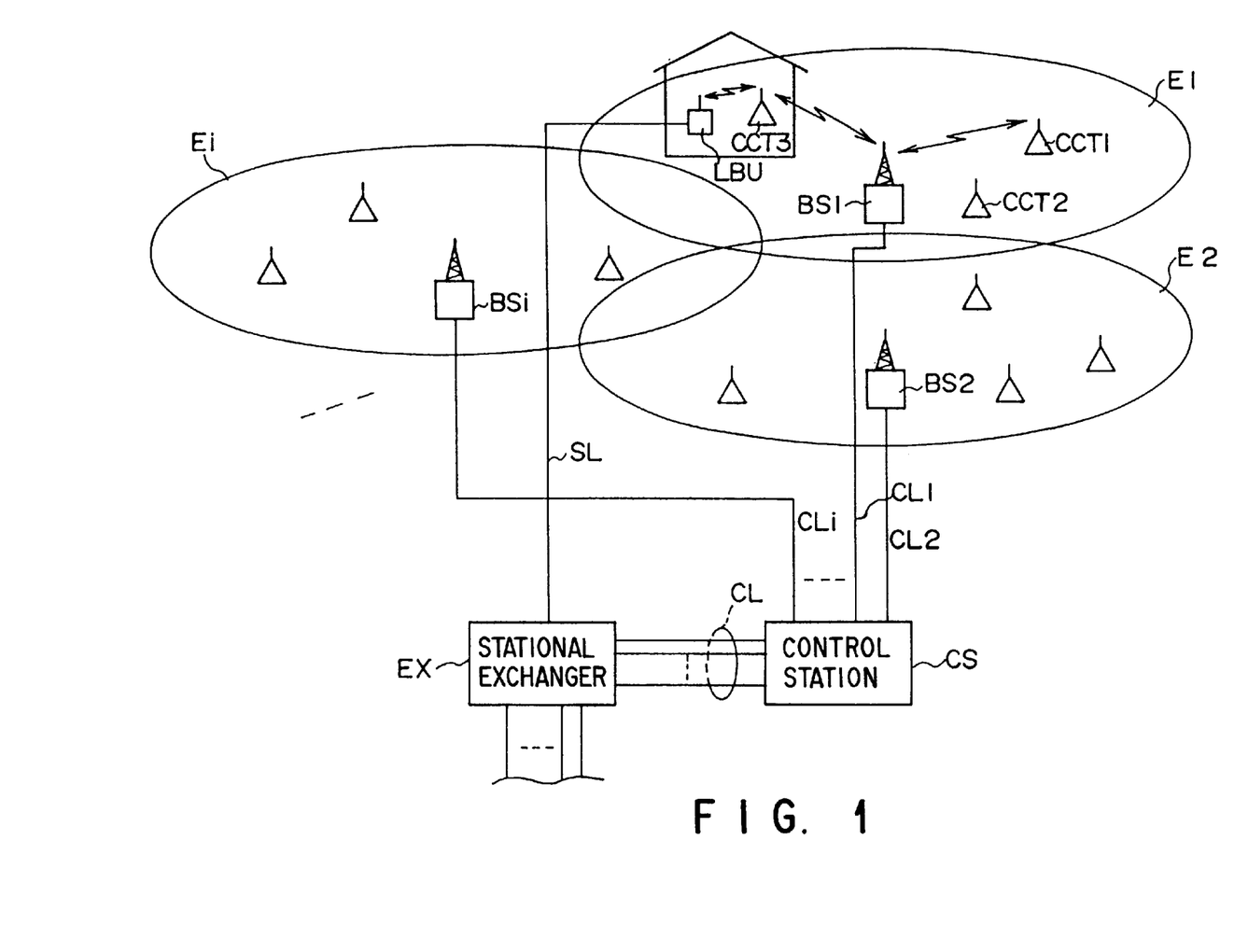
FIG. 1 shows schematically the structure of a mobile communication system according to an embodiment of the present invention.

FIG. 1 shows schematically the structure of the system of the present embodiment. The same elements as shown in FIG. 9 are denoted by like reference numerals.

A plurality of cellular base stations BS1, BS2, . . . BSi are dispersedly provided within a service area of the present system. These cellular base stations BS1, BS2, . . . BSi are connected to a control station CS via wired lines CL1, CL2, . . . CLi. The control station CS is accommodated in a stational exchanger EX of a public telephone network via a wired line group CL. The cellular base stations BS1, BS2, . . . BSi constitute radio zones E1, E2, . . . Ei called cells, respectively. In these radio zones (cells) E1, E2, . . . Ei, thirteen call channel groups F1 to F13, which are obtained by dividing the above-mentioned 790 call channels in units of a predetermined number of channels, are assigned in advance in a fixed manner to each unit of, for example, 13 cell groups, as shown in FIG. 10.

In general, wired subscriber lines accommodated in the stational exchanger EX are pulled in each home and office, whereby calls can be made with use of wired telephones.

In the system of the present embodiment, a cordless base unit LBU is connected to a terminal end of the wired subscriber line SL in parallel to a wired telephone (not shown) or independently. In each cell E1, E2, ... Ei; and, a plurality of cellular cordless telephones CCT1, CCT2, ... CCTi are used. These cellular cordless telephones CCT1, CCT2, ... CCTi are provided with a cellular mode in which radio calls are made via the cellular base stations BS1, BS2, ... BSi of the cells E1, E2, ... Ei and a cordless mode in which radio calls are made via the cordless base unit LBU.

The cordless base unit LBU is connected to the associated cellular cordless telephone CCT via a radio call channel. Thereby, the cellular cordless telephone is connected to the stational exchanger EX via the wired subscriber line SL to permit a call. The radio call channel used to connect the cordless base unit LBU and cellular cordless telephone CCT is a radio channel selected from the radio channel group which is assigned to each cell E1, E2, ... Ei of the cellular radio communication system and is other than the radio channel group assigned to the cell (cell E1 in FIG. 1) in which the cordless base unit LBU and cellular cordless telephone CCT are located. The selection of the radio channel is made by searching the radio channel at the cordless base unit LBU and cellular cordless telephone CCT.

Figure 2:
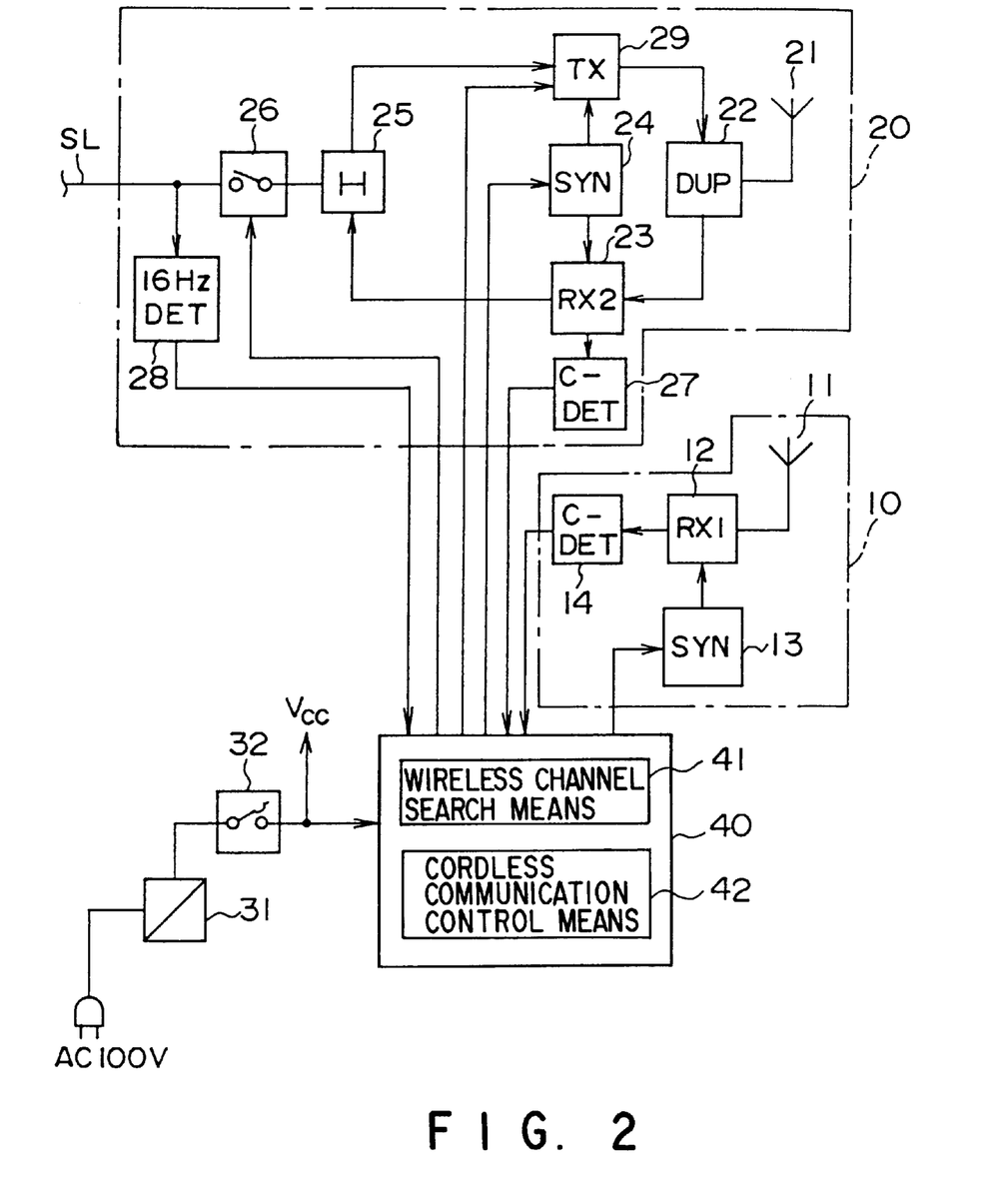
FIG. 2 is a circuit block diagram showing the structure of a cordless base unit LBU of the system as shown in FIG. 1.

FIG. 2 is a circuit block diagram showing the structure of the cordless base unit LBU. The cordless base unit LBU comprises a first receiving system 10, a cordless transmitting/receiving system 20 having a second receiving system, and a control system 40.

The first receiving system 10 receives a radio signal sent from the cellular base station BS1, BS2, ... BSi and comprises an antenna 11, a receiving circuit (RX1) 12, a frequency synthesizer (SYN) 13 functioning as a local oscillator, and a carrier detection circuit (C-DET) 14. A detection result of a carrier by the carrier detection circuit 14 is input to the control circuit 40. The oscillation frequency of the frequency synthesizer 13 is set by radio channel indication data output from the control circuit 40.

On the other hand, the cordless transmitting/receiving system 20 transmits/receives a radio signal to/from the cellular cordless telephone CCT. A radio signal sent from the cellular cordless telephone CCT is received by an antenna 21 and input to a receiving circuit (RX2) 23 via a duplexer (DUP) 22. The receiving circuit 23 mixes the radio signal with a reception local oscillation signal generated from a frequency synthesizer (SYN) 24 and converts it to an intermediate frequency signal, and further performs, e.g. FM demodulation to reproduce a reception call signal. The reception call signal is sent to the wired subscriber line SL via a hybrid circuit 25 and a line switch 26.

A call signal coming from the stational exchanger EX via the wired subscriber line SL is input to a transmission circuit (TX) 29 via a line switch 26 and a hybrid circuit 25. The transmission circuit 29 frequency-modulates the intermediate frequency signal with the sent signal and mixes the modulated intermediate frequency signal with a transmission local oscillation signal generated from the frequency synthesizer 24, thereby converting it to a radio frequency corresponding to a downward radio channel. The radio frequency signal is amplified to a predetermined second transmission level by a transmission power amplifier. The second transmission level is set to be adequately lower than a first transmission level used for a cellular call at the cellular base station BS or cellular radio telephone. For example, it is set at a weak level used in a general cordless telephone. The radio signal output from the transmission circuit 29 is supplied to the antenna via the duplexer 22 and transmitted to the cellular cordless telephone CCT from the antenna 21.

The control circuit 40 includes, for example, a microcomputer as a main control unit and has wireless channel search means 41 and cordless communication control means 42 as its functions. Reference numeral 31 denotes a power supply circuit which rectifies a commercial power output (AC100V) and produces a predetermined DC operational voltage Vcc.

The wireless channel search means 41 operates upon turning-on of a power switch 32. The radio channels used in the cellular radio communication system are successively received by the first receiving system 10, and the radio channel used in the cell where the cordless base unit LBU is located is recognized on the basis of the presence/absence of the associated carrier. On the basis of the result of recognition, a radio call channel not used in the cell where the cordless base unit LBU is located is selected from among the radio call channels (790 channels) assigned to the cellular radio communication system, and the selected one is stored as a radio channel for a cordless call.

When the cordless communication control means 42 has recognized reception of a call from the stational exchanger EX on the basis of a detection signal from a call reception detection circuit (16 Hz DET) 28, it constitutes a radio link of the cordless call radio channel between itself and the associated cellular cordless telephone CCT, thereby permitting a cordless call by the cellular cordless telephone CCT. When a call transmission request has come from the associated cellular cordless telephone CCT, the cordless communication control means 42 constitutes a radio link of the cordless call radio channel between itself and the cellular cordless telephone CCT, thereby permitting a cordless call by the cellular cordless telephone CCT.

Figure 3:
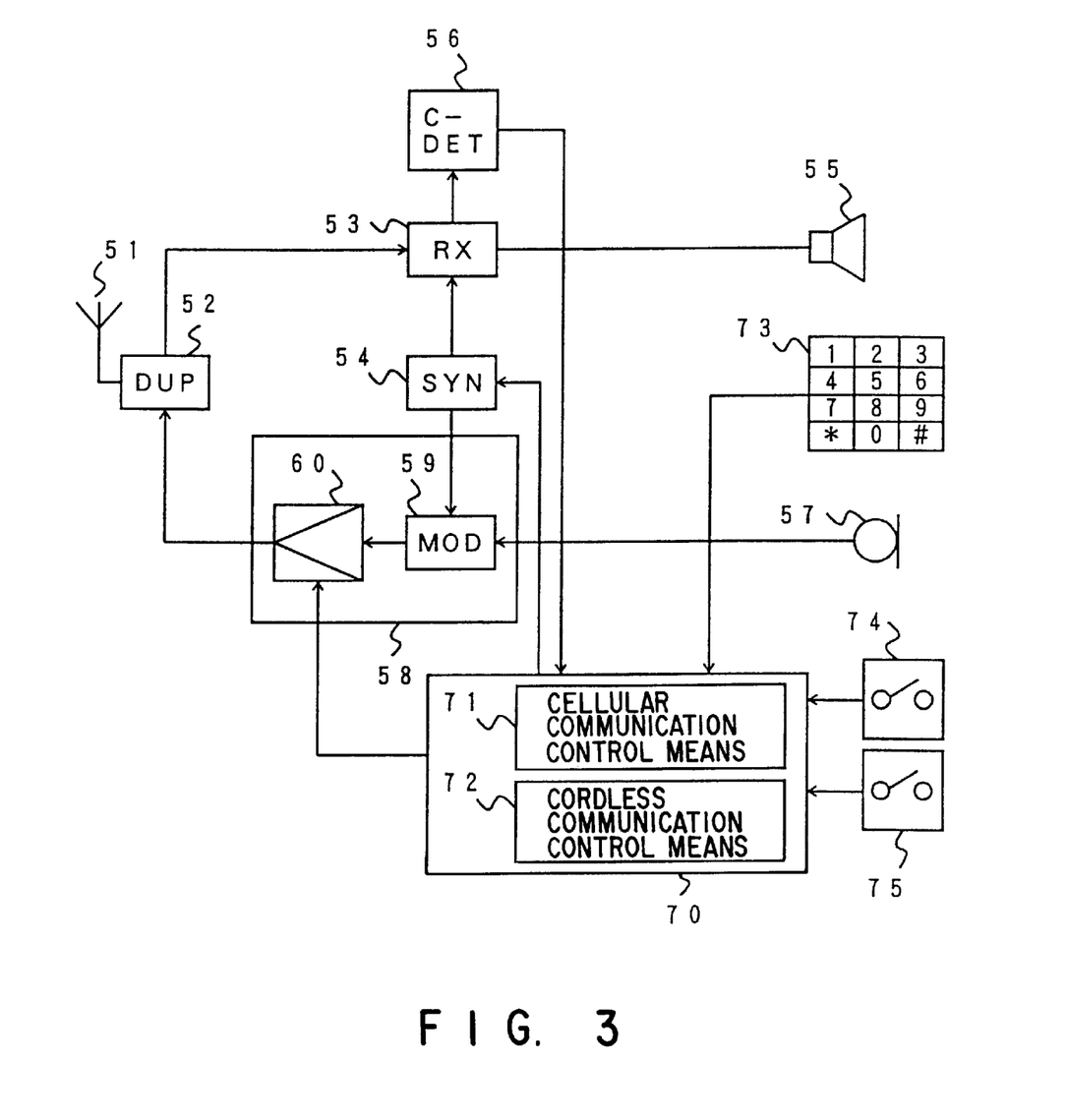
FIG. 3 is a circuit block diagram showing the structure of a cellular cordless telephone CCT of the system as shown in FIG. 1.

FIG. 3 is a circuit block diagram showing the structure of the cellular cordless telephone CCT. In the figure, a radio signal sent from the cellular base station and cordless base unit LBU is received by an antenna 51 and input to a reception circuit (RX) 53 via a duplexer (DUP) 52. In the reception circuit 53, the radio signal is mixed with a reception local oscillation signal generated from a frequency synthesizer (SYN) 54 and converted to an intermediate frequency signal and then frequency-modulated to be reproduced as a reception call signal. The reception call signal is supplied to a loudspeaker 55 serving as a receiver via a call reception circuit (not shown) and output from the loudspeaker 55.

Reference numeral 56 denotes a carrier detection circuit (C-DET) which detects the presence/absence of the carrier of the radio channel and tells the detection result to a control circuit 70.

On the other hand, a transmission speech signal input to a microphone 57 serving as a transmitter is input to a transmission circuit 58 via a transmission speech circuit (not shown). The transmission circuit 58 comprises an FM modulation circuit (MOD) 59 and a transmission power amplifying circuit 60. In the FM modulation circuit 59, a transmission intermediate frequency signal is frequency-modulated by the transmission speech signal and converted to a radio frequency corresponding to the radio call channel. The transmission power amplifying circuit 60 is constituted by a variable gain amplifier and the gain thereof is set by a command from the control circuit 70. According to the gain, the radio signal is amplified to a predetermined level and output. The radio signal output from the transmission power amplifying circuit 60 is delivered to the antenna 51 via the duplexer 52 and is transmitted to the cellular base station BS or cordless base unit LBU from the antenna 51.

The control circuit 70 includes, for example, a microcomputer as a main control unit and has, as its control functions, cellular communication control means 71 functioning in the cellular mode and cordless communication control means 72 functioning in the cordless mode.

The cellular communication control means 71 monitors a call reception from the cellular base station BS and also monitors the operation of a call transmission switch 74 in the wait state in which the cellular mode is being set. When a call reception or a call transmission has occurred, the control means 71 constitutes a radio link of the radio call channel between itself and the cellular base station BS, thus permitting a cellular call. In addition, the control means 71 monitors a mode switch in the wait state. When the mode switch 75 is operated, the operation mode is switched to the cordless mode.

When the mode switch 75 is operated and the mode is switched to the cordless mode, the cordless communication control means 72 searches a radio channel for use in the cordless call and stays in the wait state. If a call reception notice has come form the cordless base unit LBU or the call transmission switch 75 is operated in this state, the control means 72 constitutes a radio link of the radio call channel for a cordless call between itself and the cordless base unit LBU, thus permitting a cordless call.

Numeral 73 denotes dial keys for inputting dial information.

The operation of the system having the above structure will now be described.

Figure 6:
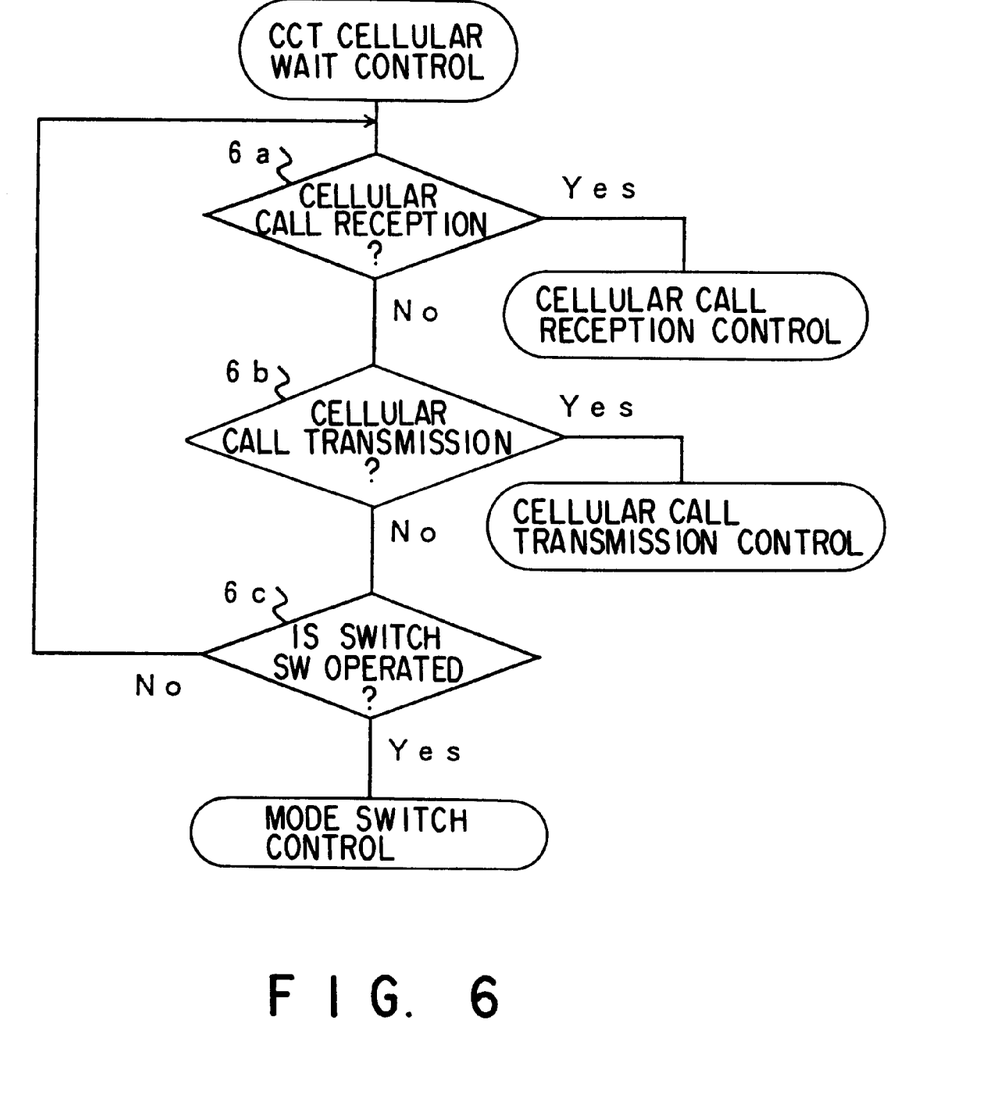
FIG. 6 is a flow chart illustrating a cellular wait control procedure and the content of control by a control circuit of the cellular cordless telephone CCT as shown in FIG. 3.

While the user is being out of his home, he sets its own cellular cordless telephone CCT in the cellular mode. In the cellular cordless telephone CCT in this cellular mode, the control circuit 70 monitors the coming of the call reception signal from the cellular base station BS and the operation of the call transmission switch 74 in steps 6a and 6b in FIG. 6. In this state, if the call reception signal has come from the cellular base station BS, the radio channel is captured according to the channel indication data from the base station BS and a radio link of this radio channel is formed with the cellular base station BS. Subsequently, control for cellular communication is effected.

During the cellular communication, the control circuit 70 supplies a gain control signal to the transmission power amplifying circuit 60 for the purpose of the cellular communication. Thus, the gain of the transmission power amplifying circuit 60 is set at a value corresponding to a predetermined transmission level determined by the cellular communication system according to the gain control signal. Thereby, the radio transmission signal is amplified to a necessary and full transmission level for reception by the cellular base station BS in accordance with the distance from the cellular base station BS, and the amplified signal is transmitted.

If the user has come back to his home or office, he turns on the power switch 32 of the cordless base unit LBU and operates the mode switch 74 of his own cellular cordless telephone (e.g. CCT3 in FIG. 1) to switch the mode to the cordless mode.

Figure 4:
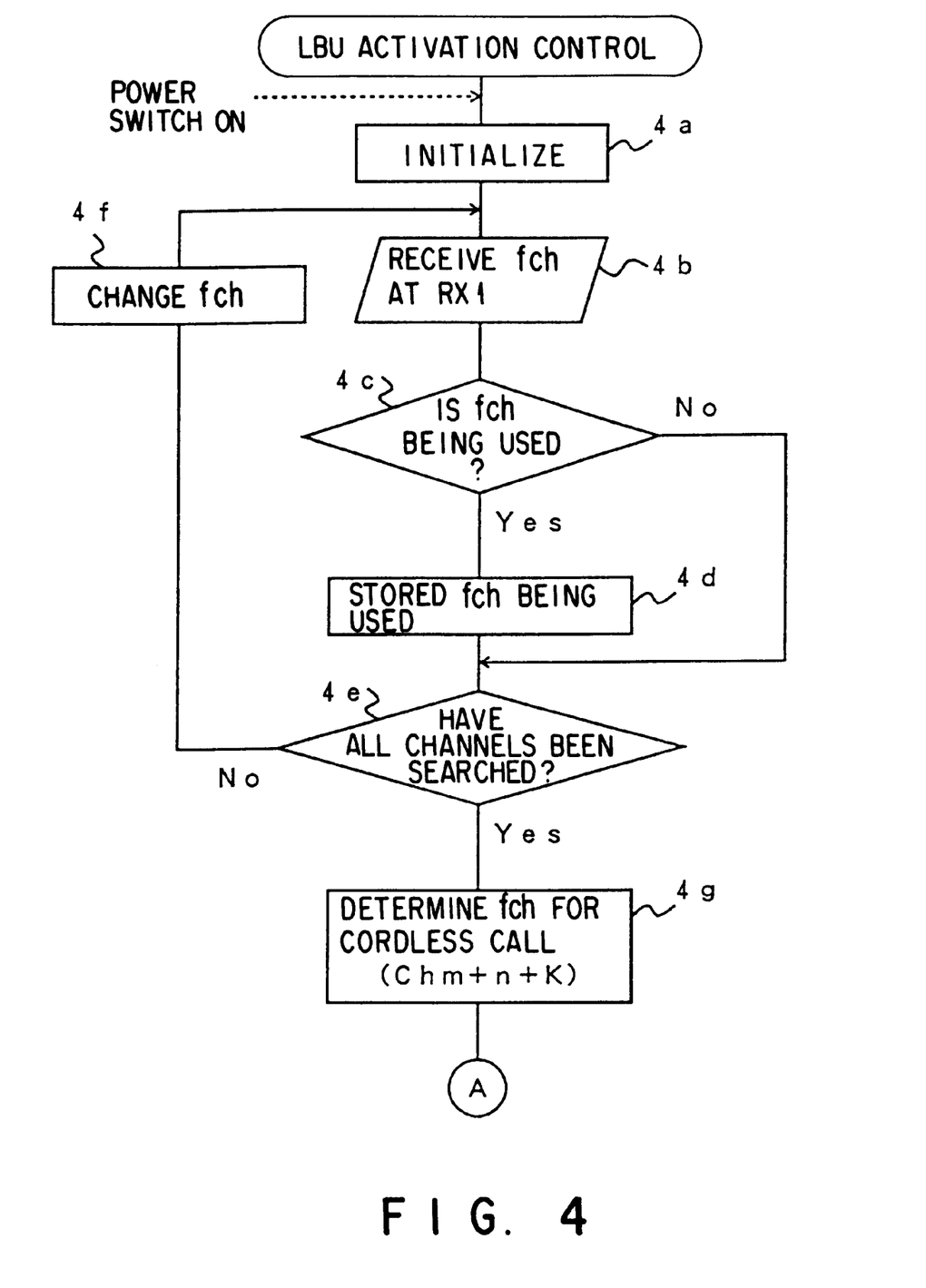
FIG. 4 is a flow chart illustrating the first half of an activation control procedure and the content of control by a control circuit of the cordless base unit LBU as shown in FIG. 2.

Then, in step 4a in FIG. 4, the control circuit 40 of the cordless base unit LBU initializes the respective units. Thereafter, the radio channel assigned to the base station BS1 is searched.

Specifically, the control circuit 40 selects one of radio channels assigned to the cellular radio communication system, and sets a local oscillation frequency corresponding to the frequency synthesizer 13 of the first receiving system 10 so as to receive the frequency fch of this selected radio channel in step 4b. Thus, the first receiving system 10 performs the reception operation of the radio channel frequency fch. The carrier detection circuit 14 detects the result of reception, i.e., the presence/absence of the carrier and transmits the result of detection to the control circuit 40. In step 4c, the control circuit 40 determines whether the radio channel is a radio channel used by the base station BS1 on the basis of the presence/absence of the carrier. If the radio channel is that being used, the control circuit 40 determines in step 4d that this radio channel is the radio channel assigned to the cell E1 in which the cordless base unit LBU is present and stores it in the memory. The control routine then advances to step 4e. On the other hand, if the radio channel is not being used, the control goes to step 4e. In step 4e, it is determined whether all channels assigned to the system have been searched. If there is a non-searched channel, a radio channel fch to be received subsequently is selected in step 4f and the control returns to the receiving step 4b. Then, the radio channel search control of steps 4b to 4f is repeated until the channel has been searched completely.

If all channels have been searched, the control circuit 40 provisionally determines in step 4g the radio channel for the cordless call on the basis of the radio channel determined to be in use by the search. For example, if radio channels Chm to Chm+n are assigned to the cellular base station BS1, a radio channel Chm+n+k, which is discrete by a predetermined frequency, is selected from the radio channels Chm to Chm+n as a radio channel for the cordless call.

Figure 7:
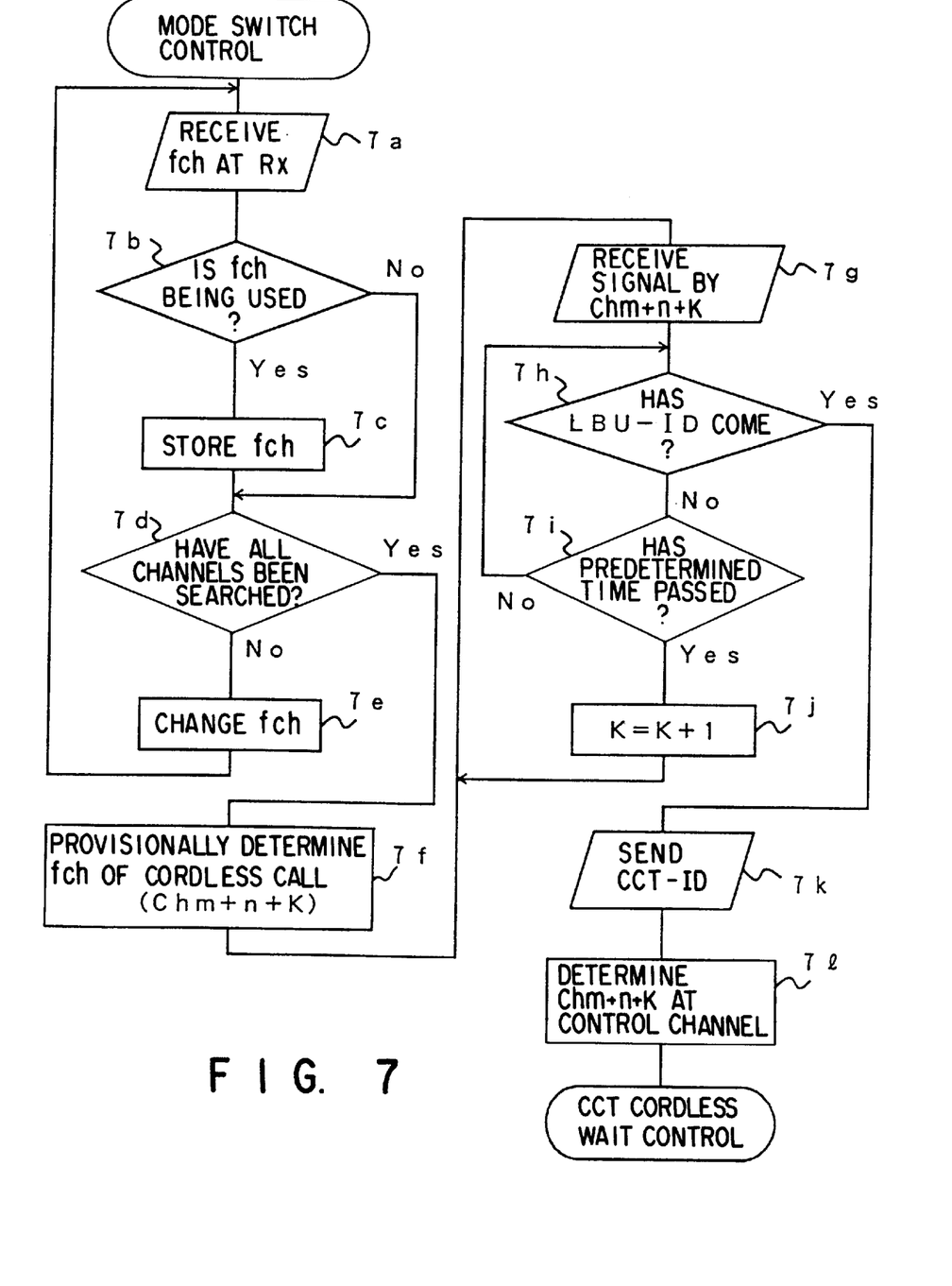
FIG. 7 is a flow chart illustrating a mode switch control procedure and the content of control by the control circuit of the cellular cordless telephone CCT as shown in FIG. 3.

On the other hand, if the mode switch 74 is operated, the cellular cordless telephone CCT3 executes the mode switch control by the control circuit 70. FIG. 7 is a flow chart illustrating the control procedure and control content therefor.

Specifically, in step 7a, the control circuit 70 selects one of the radio channels assigned to the cellular radio communication system. The frequency fch of this radio channel is received by the reception circuit RX. In step 7b, the use/non-use of the radio channel is determined on the basis of the presence/absence of the carrier detected by the carrier detection circuit 56 at this time. If it is determined that the radio channel is being used, it is determined in step 7c that this radio channel is that assigned to the cell E1 where the cellular cordless telephone CCT3 is located, and this radio channel is stored. The control advances to step 7d.

On the other hand, if the radio channel is not being used, the control goes to step 7d directly. In step 7d, it is determined whether all channels assigned to the system have been completely searched. If there is a non-searched channel, the radio channel frequency fch to be received subsequently is selected and then the control returns to the reception in step 7a.

Following this, the radio channel search control in steps 7a to 7e is repeated until the channel has been searched.

If all channels have been searched, the control circuit 70 provisionally determines in step 7f the radio channel for the cordless call on the basis of the radio channel determined to be in use by the search. For example, if radio channels Chm to Chm+n are assigned to the cellular base station BS1, a radio channel Chm+n+k, which is discrete by a predetermined frequency, is selected from the radio channels Chm to Chm+n as a radio channel for the cordless call.

Thus, at the cordless base unit LBU and cellular cordless telephone CCT3, respectively, the radio channel for the cordless call is provisionally set.

Figure 5:
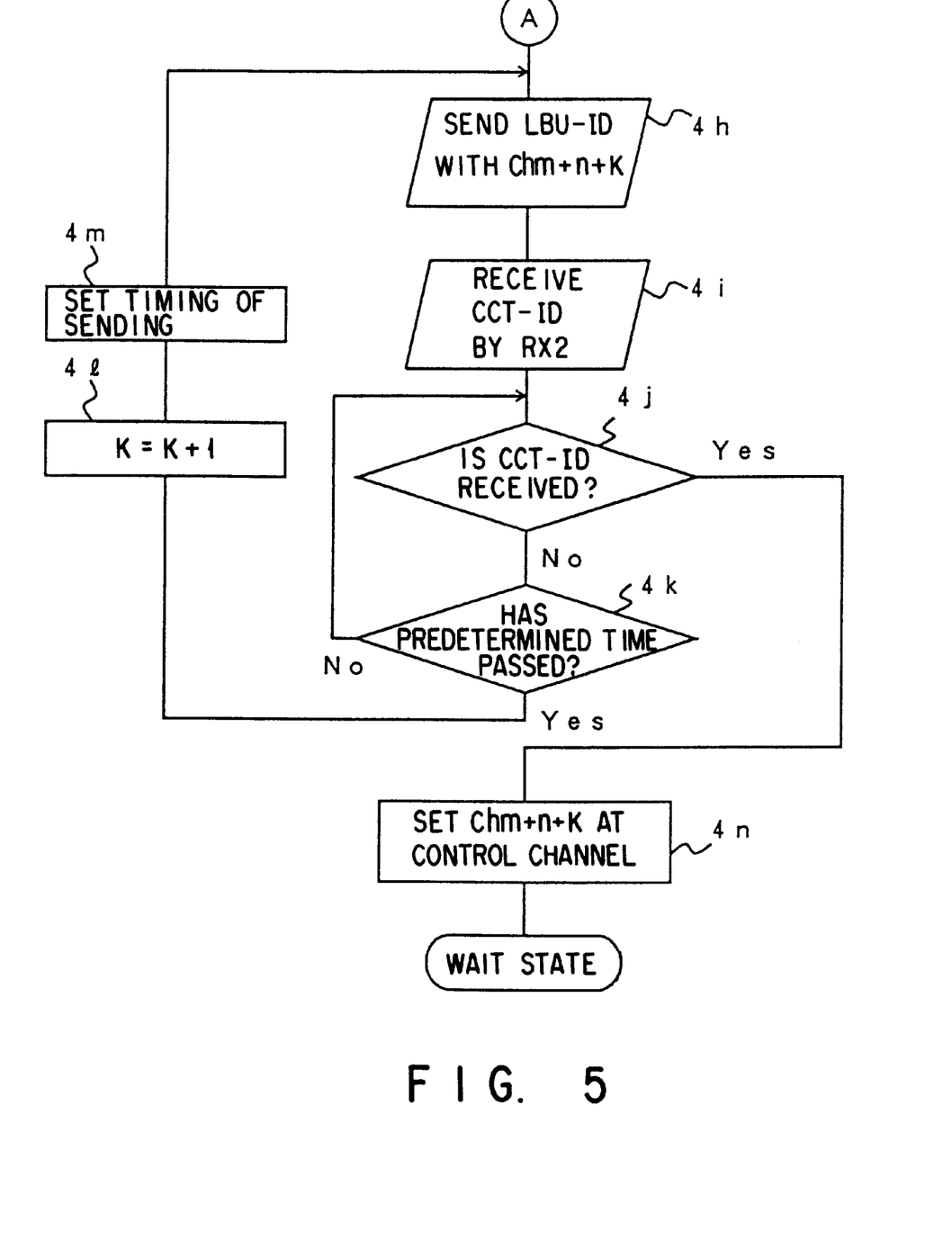
FIG. 5 is a flow chart illustrating the second half of the activation control procedure and the content of control by the control circuit of the cordless base unit LBU as shown in FIG. 2.

If the radio channel for the cordless call has been provisionally set, the control circuit 40 of the cordless base unit LBU uses the radio channel Chm+n+k in step 4h, as shown in FIG. 5, and sends identification information LBU-ID of the cordless base unit LBU from the transmission circuit 29.

On the other hand, the control circuit 70 of the cellular cordless telephone CCT3 receives the radio signal from the cordless base unit LBU with the provisionally set radio channel Chm+n+k in step 7g, as shown in FIG. 7. While the passing of a predetermined time period is-being monitored in step 7i, the reception of identification information LBU-ID from the cordless base unit LBU is detected in step 7h. If LBU-ID does not come within the predetermined time period, the control circuit 70 executes step 7j to increase k and select the next radio channel Chm+n+(k+1) and returns to step 7g. Then, the radio signal from the cordless base unit LBU is received with the radio channel Chm+n+(k+1) and the reception of identification information LBU-ID is monitored in steps 7h and 7i.

In this state, suppose that the identification information LBU-ID has come to the present device from the cordless base unit LBU via a radio channel. In this case, the control circuit 70 of the cellular cordless telephone CCT3 executes step 7k and sends its own identification information CCT-ID via the radio channel which received the LBU-ID. In step 7l, the radio channel which received the LBU-ID is formally set as a control channel, and the control circuit comes into the cordless wait state.

On the other hand, when the control circuit 40 of the cordless base unit LBU has sent its own identification information LBU-ID, it detects the return of identification information CCT-ID from the cellular cordless telephone CCT3 in step 4i, while monitoring the passing of a predetermined time period. If CCT-ID does not come within the predetermined time period, the control circuit 40 goes to step 41 to increase k and select the next radio channel Chm+n+(k+1). In addition, after a predetermined time period in step 4m, the control returns to step 4h and LBU-ID is sent out with the radio channel Chm+n+(k+1). Thereafter, until CCT-ID is returned, the radio channel Chm+n+k is shifted in units of one channel in steps 4h to 4m, and LBU-ID is sent out repeatedly at every predetermined time period.

Besides, suppose that identification information CCT-ID was returned from the cellular cordless telephone CCT3 within a predetermined time period, and the returned identification information CCT-ID coincided with the identification information of the cellular cordless telephone CCT3 corresponding to the pre-registered present unit. In this case, in step 4n, the radio channel Chm+n+k is set as a control channel and thereafter the cordless base unit LBU is set in the cordless wait state by this control channel.

Thus, radio connection control can be carried out between the cellular cordless telephone CCT3 and cordless base unit LBU via the control channel Chm+n+k.

Next, a description will now be given of the case where in this cordless wait state a call has been made to the cellular cordless telephone CCT3 from a wired telephone connected to the public telephone network or another cellular cordless telephone CCT.

Figure 8:
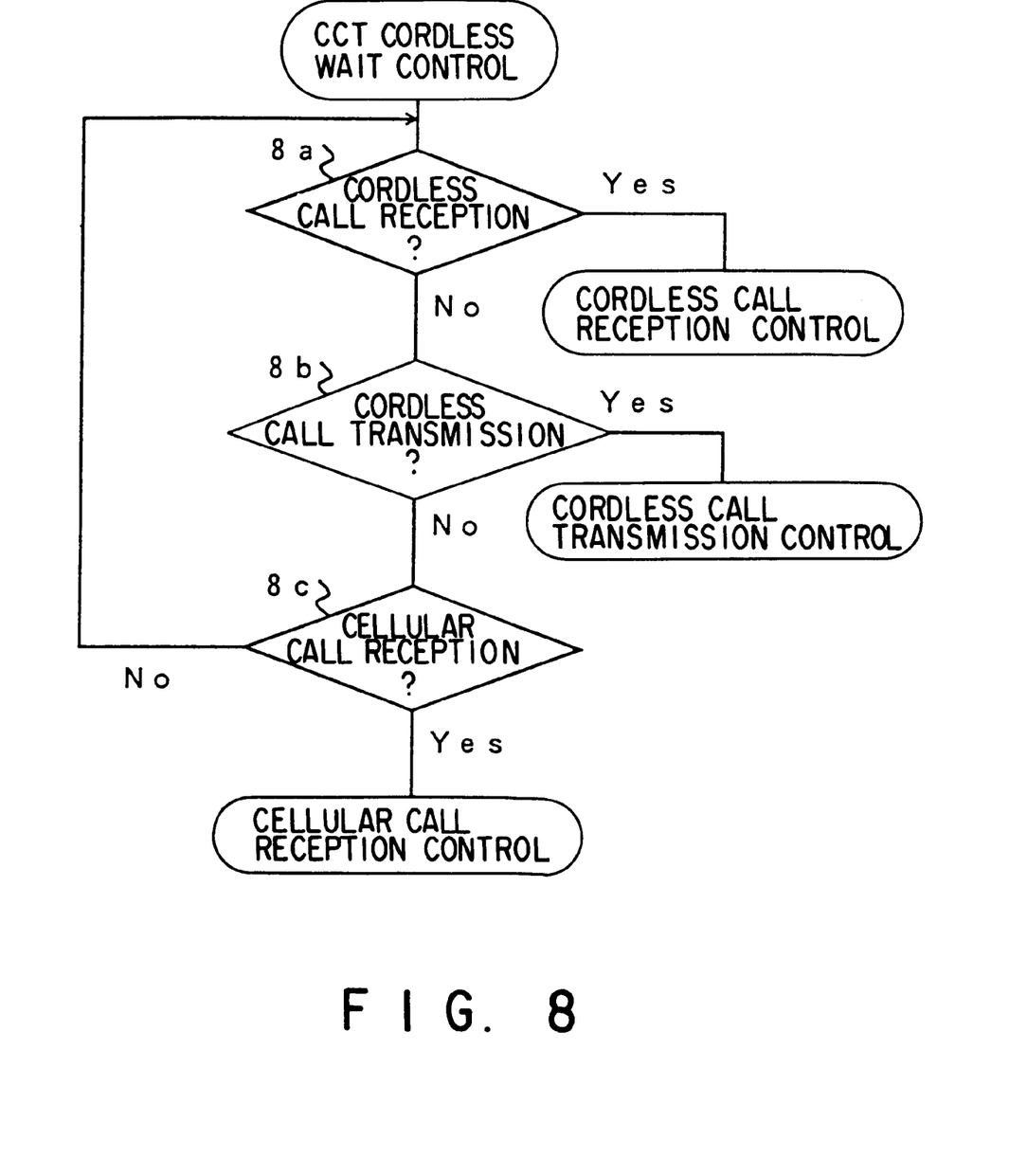
FIG. 8 is a flow chart illustrating a cordless wait control procedure and the content of control by the control circuit of the cellular cordless telephone CCT as shown in FIG. 3.

In the cordless wait state, for example, in steps 8a and 8b in FIG. 8, the cellular cordless telephone CCT3 monitors the reception of a call reception notice from the cordless base unit LBU and the call transmission operation by the call transmission switch 74, and at the same time monitors repeatedly whether a call has come via the cellular radio communication system. On the other hand, the cordless base unit LBU repeatedly monitors the call reception signal from the stational exchanger EX via the wired subscriber line SL and the incoming of the call transmission signal from the cellular cordless telephone CCT3.

In this state, suppose that the wired telephone connected, for example, to the stational exchanger EX is unhooked to make a call to the cellular cordless telephone CCT3 and then the telephone number of the cellular cordless telephone CCT3, e.g. "01234578888", was dialed. The stational exchanger EX performs a call operation for the associated cellular cordless telephone CCT3 on the basis of the telephone number "01234578888" and the stored LBU-ID of the home or office associated with the telephone number, e.g. "08802461470."

Specifically, when the cellular cordless telephone CCT3 is located outside the radio area of the cordless base unit LBU, for example, when the user is out of the home, the stational exchanger EX determines from the aforementioned telephone number "01234578888" that the destination of the call is the cellular cordless telephone and transfers a call reception notice and the aforementioned telephone number to the control station CS. Then, the control station CS recognizes the cell where the cellular cordless telephone CCT3 is located and sends a call reception request and the telephone number to the cellular base station BS1 of the cell E1. The cellular base station BS1 sends call reception signals to the cellular cordless telephones within the cell E1. If the cellular cordless telephone CCT3 of the call destination responds, a radio link is formed between the cellular base station BS1 and the cellular cordless telephone CCT3 by using the radio channel assigned to the cellular base station BS1. Thereafter, a call is permitted between the caller and the user of the cellular cordless telephone CCT3. In other words, a cellular call is permitted via the cellular base station BS1.

On the other hand, if the cellular cordless telephone CCT3 is present within the radio area of the cordless base unit LBU, the stational exchanger EX determines whether the identification information of the cordless base unit LBU is registered such that it is associated with the aforementioned telephone number "01234578888." If this identification information is registered, a call reception signal is sent to the wired subscriber line SL corresponding to the cordless base unit LBU. Then, if the call reception signal is detected by the call reception detection circuit 28 in the cordless base unit LBU of the call destination, the call reception signal is sent to the cellular cordless telephone CCT3 via the set control channel. If the cellular cordless telephone CCT3 responds, a radio link is constituted between the cordless base unit LBU and cellular cordless telephone CCT3 via the radio channel used as the control channel or via another available radio channel. Thereafter, a call between the caller and the user of the cellular cordless telephone CCT3 is permitted. In other words, a call is permitted via the cordless base unit LBU and wired subscriber line SL, that is, a cordless call is permitted.

While the radio connection control and call control for the cordless communication are being effected, the transmission power level of the cellular cordless telephone CCT3 is controlled to a very low level according to a command from the control circuit 70.

As has been described above, in the system of the present embodiment, the cordless base unit LBU is connected to the wired subscriber line. In the base unit LBU, a radio channel assigned to the cell other than the cell where the base unit LBU is located is detected from among the radio channels assigned to the cells of the cellular radio communication system. This radio channel is used as a radio channel for a cordless call. On the other hand, the cellular cordless telephone CCT is provided with the mode switch 74. When the cordless mode has been designated by the mode switch 74, a radio channel assigned to the cell other than the cell where the cellular cordless telephone CCT is located is detected from among the radio channels assigned to the cells of the cellular radio communication system. This radio channel is used as a radio channel for a cordless call. At the time of the cordless call, the transmission power level is set at a weaker level than at the time of the cellular call.

Thus, according to the system of the present embodiment, only by buying the cordless base unit LBU and connecting it to the subscriber line SL, can the user make a cellular call, e.g. in the outdoors, with the cellular cordless telephone CCT by making use of the cellular radio communication system. Besides, in the home or office, the user can make a cordless call by making use of the wired subscriber line SL. Thus, with the parallel use of the wired subscriber line SL, a wide communication area characterizing the cellular terminal can be maintained and the call fee can be economically reduced. Furthermore, the user does not need to selectively use the portable telephone for the cellular radio communication system or the wired telephone installed in the home or office. Only by using a single cellular cordless telephone CCT can the user make a cellular call or a cordless call easily.

In the system of the present embodiment, a radio channel assigned to the cell other than the cell where the cellular cordless telephone CCT is located is detected from among the radio channels assigned to the cells of the cellular radio communication system. This radio channel is used as a radio channel for a cordless call. In addition, at the time of the cordless call, the transmission power level of the cellular cordless telephone CCT is variably set at a low level. Thus, there is no need to provide a new radio channel for the cordless call, and the efficiency of use of the radio channel assigned to the cellular radio communication system can be enhanced. Moreover, there is no adverse affect such as jamming in the cellular radio communication system, resulting in high-quality calls.

Furthermore, in the present embodiment, the cellular mode and cordless mode can be switched by the mode switch 74 in the cellular cordless telephone CCT. Thus, the cellular call and cordless call can be made only by providing a single transmission/reception circuit. Therefore, the cellular cordless telephone CCT can be simplified and reduced in weight.

The present invention is not limited to the above embodiment. For example, in the above embodiment, the cellular cordless telephone CCT is provided with the mode switch 74, and either the cellular mode or cordless mode is selected by the mode switch 74. However, the selection of the cellular mode or cordless mode may be automatically effected by structural modification.

For this purpose, for example, the cellular cordless telephone CCT is designed to receive the radio signal from the associated cordless base unit LBU at the time of wait. While this radio signal is being received, the cordless mode is set. During the other time period, the cellular mode is set.

It is also desirable that the cellular cordless telephone CCT receive the radio signal from the cellular base station BS and the radio signal from the cordless base unit LBU in a time-sharing manner, in the state in which the cellular cordless telephone CCT can receive both the radio signal from the cellular base station BS and the radio signal from the cordless base unit LBU. Thereby, a single receiving system can detect the call reception from the cellular base station BS and cordless base unit LBU.

Furthermore, in the above embodiment, when a call reception occurs to the cellular cordless telephone CCT, a call reception access via the cellular base station BS and a call reception access via the wired subscriber line SL and cordless base unit LBU are performed simultaneously in parallel. However, these accesses may be performed successively. For example, at first, the call reception access via the wired subscriber line SL and cordless base unit LBU is performed. If a link is not formed after a predetermined time period therefrom, the call reception access via the cellular base station BS is performed. Thus, an inexpensive cordless call via the wired subscriber line SL can be made preferentially, thereby further saving the call fee. In this case, however, if the cellular cordless telephone CCT does not respond to the call reception access via the wired subscriber line SL, the connection with the cellular cordless telephone CCT requires a longer time. Thus, it is desirable to generate, until the connection, a tone signal or a speech message indicating to the caller that the call is being accessed.

In the above embodiment, the cordless base unit LBU is provided with the first receiving system 10 for receiving the radio signal from the cellular base station and the second receiving system for receiving the radio signal from the cellular cordless telephone CCT. It is possible, however, to integrate these receiving systems, thereby receiving both radio signals, for example, in a time-sharing manner. Thus, the hardware structure of the cordless base unit LBU can be simplified and reduced in size. Accordingly, the cost of the unit can be decreased.

In the above embodiment, the system adopts an analog modulation system such as FM system as modulation system. However, the present invention can be applied to systems adopting a digital modulation system such as $\pi/4$ shift QPSK system or a so-called dual mode system in which an analog system and a digital system are combined.

Besides, various modifications can be made without departing from the spirit of the present invention with respect to the structures of the mobile unit and fixed unit, the radio channel searching method, the radio link setting procedure, the control procedure and control content by the mobile unit and fixed unit at the time of call reception/transmission, the method of controlling the transmission output level in the mobile unit.

What is claimed is:

1. A fixed unit situated in a physical area of a cellular communication system wherein the physical area is divided into a plurality of cells, each cell comprising a base unit and being assigned one of a plurality of communication channel groups employed in said cellular communication system, such that at least those of the communication channel groups which are assigned to adjacent ones of the cells are different from each other, and radio communication is performed between the base units of the cells and a mobile unit moving in the physical area by using communication channels of the communication channel groups, said fixed unit comprising:

a wired communication circuit configured for signal transmission/reception with a communication network via a wired line;

a control circuit for sequentially receiving signals transmitted via communication channels included in communication channel groups assigned to cells of the cellular communication system, identifying, on the basis of the reception results, the one of the communication channel groups which is assigned to the one of the cells in which a fixed unit is situated, selecting, on the basis of the identification results, those of the communication channel groups which are not assigned to the one cell in which the fixed unit is situated, and storing the selected communication channel groups;

a radio communication circuit configured to select a communication channel to be used, on the basis of the communication channel groups stored in said control circuit, and to perform signal transmission/reception with the mobile unit via the selected communication channel; and a communication control circuit configured to connect the wired communication circuit and the radio communication circuit in the case of performing communication between the communication network and the mobile unit.

2. The fixed unit according to claim 1, wherein said radio communication between said base unit and said mobile unit is performed at a level in a first transmission output level range.

3. The fixed unit according to claim 2, wherein said signal transmission/reception with said mobile unit is performed at a level which is lower than the output levels in the first transmission output level range.

4. A mobile unit used in a cellular communication system wherein a physical area is divided into a plurality of cells, each cell comprising a base unit and being assigned one of a plurality of communication channel groups employed in the cellular communication system, such that at least those of the communication channel groups which are assigned to adjacent ones of the cells are different from each other, and radio communication is performed between the base units of the cells and a mobile unit moving in the physical area by using communication channels of the communication channel groups, said mobile unit comprising:

an operation circuit configured to designate the base unit or a fixed unit as a destination of communication connection;

a control circuit for sequentially receiving signals transmitted via communication channels included in communication channel groups assigned to cells of the cellular communication system, identifying, on the basis of the reception results, the one of the communication channel groups which is assigned to the one of the cells in which the mobile unit is situated, selecting, on the basis of the identification results, those of the communication channel groups which are not assigned to the one cell in which the mobile unit is situated, and storing the selected communication channel groups;

a receiving circuit configured to selectively receive, in accordance with a designated result of the operation circuit, a signal sent via a communication channel of the communication channel group assigned to the cell in which the mobile unit is located or a signal sent from the fixed unit via a communication channel of one of the communication channel groups stored in the control circuit; and a transmission circuit configured to perform, in accordance with the designated result of the operation circuit, transmission in a first case of performing radio communication with the base unit and transmission in a second case of performing communication with the fixed unit.

5. The mobile unit according to claim 4, wherein said radio communication between said base unit and said mobile unit is performed at a level in a first transmission output level range.

6. The mobile unit according to claim 5, wherein said transmission circuit performs transmission at a level in the first transmission output level range in the first case of performing radio communication with the base unit and transmission at a level which is lower than the output levels in the first transmission output level range in the second case of performing communication with the fixed unit.

7. A fixed unit situated in a physical area of a cellular communication system wherein the physical area is divided into a plurality of cells, each cell comprising a base unit and being assigned one of a plurality of communication channel groups employed in the cellular communication system, such that at least those of the communication channel groups which are assigned to adjacent ones of the cells are different from each other, and radio communication is performed between the base units of the cells and a mobile unit moving in the physical area by using communication channels of the communication channel groups, said fixed unit comprising:

a wired communication circuit configured for signal transmission/reception with a communication network via a wired line;

a radio communication circuit for sequentially receiving signals transmitted via communication channels included in communication channel groups employed in the cellular communication system, identifying, on the basis of the reception results, the one of the communication channel groups which is assigned to the one of the cells in which a fixed unit is situated, selecting, on the basis of the identification results, those of the communication channel groups which are not assigned to the one cell in which the fixed unit is situated, and storing the selected communication channel groups; and a communication control circuit configured to connect the wired communication circuit and the radio communication circuit in a case of performing communication between the communication network and the mobile unit.

8. A mobile unit of a cellular communication system used in a mobile communication system comprising the cellular communication system wherein a physical area is divided into a plurality of cells, each cell comprising a base unit and being assigned one of a plurality of communication channel groups employed in the cellular communication system, such that at least those of the communication channel groups which are assigned to adjacent one of the cells are different from each other, and radio communication is performed between the base units of the cells and the mobile unit moving in the physical area, and a fixed unit situated in said physical area of the cellular communication system and connected to a communication network via a wired line, said mobile unit comprising;

a connection destination determining circuit configured to determine the base unit or the fixed unit as a destination of radio connection;

a first radio communication circuit configured to perform radio communication with the base unit of one of the cells, when the base unit is determined as the destination of radio connection by the connection destination determining circuit, by selectively using a communication channel of the communication channel group assigned to the cell in which the mobile unit is located;

a control circuit for sequentially receiving signals transmitted via communication channels included in communication channel groups assigned to cells of the cellular communication system, identifying, on the basis of the reception results, the one of the communication channel groups which is assigned to the one of the cells in which the mobile unit is situated, selecting, on the basis of the identification results, those of the communication channel groups which are not assigned to the one cell in which the mobile unit is situated, and storing the selected communication channel groups: and a second radio communication circuit configured to perform radio communication with the fixed unit, when the fixed unit is determined as the destination of radio connection by the connection destination determining circuit, by selectively using a communication channel of one of the communication channel groups stored in the control circuit.

9. The mobile communication system according to claim 8, wherein said connection destination determining circuit determines the base unit or the fixed unit as the destination of radio connection, on the basis of information for designating the connection destination input by an operation circuit.

10. The mobile communication system according to claim 8, wherein said connection destination determining circuit includes a circuit configured to determine whether an associated mobile unit is present in such a position as to permit radio communication with the fixed unit, and the connection destination determining circuit determines the fixed unit as the radio connection destination if said circuit has determined that the associated mobile unit is present in such a position as to permit radio communication with the fixed unit, and determines the base unit as the radio connection destination in another case.

11. The mobile unit according to claim 8, wherein said radio communication between said base unit and said mobile unit is performed at a transmission output level in a first transmission output level range.

12. The mobile unit according to claim 11, wherein said radio communication between said mobile unit and said fixed unit is performed at a transmission output level which is lower than the output levels in the first transmission output level range.

13. A mobile communication system comprising:

a cellular communication system covering a physical area which is divided into a plurality of cells, each cell comprising a base unit and being assigned one of a plurality of communication channel groups employed in the mobile communication system, such that at least those of the communication channel groups which are assigned to the adjacent ones of the cells are different from each other;

a communication network;

a mobile unit movable in the physical area and configured to communicate with a base unit of a cell in which the mobile unit is located using a communication channel in the communication channel group associated with the cell in which the mobile unit is located; and a fixed unit connection to the communication network, wherein said fixed unit comprises:

a control circuit for sequentially receiving signals transmitted via communication channels included in communication channel groups assigned to cells of the cellular communication system, identifying, on the basis of the reception results, the one of the communication channel groups which is assigned to the one of the cells in which a fixed unit is situated, selecting, on the basis of the identification results, those of the communication channel groups which are not assigned to the one cell in which the fixed unit is situated, and storing the selected communication channel groups; and a radio communication circuit configured to select a communication channel to be used, on the basis of the communication channel groups stored in said control circuit, and to perform signal transmission/reception with the mobile unit via the selected communication channel.

14. The mobile communication system of claim 13, wherein the fixed unit is connected to the communication network via a wired line.

15. A system comprising a fixed unit connected to a communication network and a mobile unit configured to communicate with a base unit of a cell in which the mobile unit is located, the cell being in a cellular communication system having a plurality of cells wherein said fixed unit comprises:

a control circuit for sequentially receiving signals transmitted via communication channels included in communication channel groups assigned to cells of the cellular communication system, identifying, on the basis of the reception results, the one of the communication channel groups which is assigned to the one of the cells in which a fixed unit is situated, selecting, on the basis of the identification results, those of the communication channel groups which are not assigned to the one cell in which the fixed unit is situated, and storing the selected communication channel groups; and a radio communication circuit configured to select a communication channel to be used, on the basis of the communication channel groups stored in said control circuit, and to perform signal transmission/reception with the mobile unit via the selected communication channel.

16. The apparatus of claim 15, wherein the fixed unit is connected to the communication network via a wired line.

17. A mobile communication system comprising:

a cellular communication system for covering a geographical area which is geographically divided into a plurality of cells, each cell comprising a base unit and being assigned one of a plurality of communication channel groups employed in said cellular communication system, such that at least those of the communication channel groups which are assigned to adjacent ones of the cells are different from each other, wherein radio communication is performed between the base unit, and a mobile unit moving in the geographical area, using a communication channel included in the one of the communication channel groups and a first transmission output level; and a fixed unit connected to a communication network via a wired line, wherein said mobile unit and said fixed unit comprise:

identification means for sequentially receiving communication channels included in the communication channel groups employed in said cellular communication system, and identifying, on the basis of the reception results, the one of the communication channel groups which is assigned to the one of the cells in which the mobile unit is situated;

storage means for selecting, on the basis of the identification results, those of the communication channel groups employed in said cellular communication system which are not assigned to the one of the cells at which the mobile unit is situated, and storing the selected communication channel groups; and means for performing radio communication between the mobile unit and the fixed unit, using a communication channel included in the communication channel groups stored in the storage means, and a second transmission output level lower than the first transmission output level.

18. A mobile communication system comprising:

a cellular communication system for covering a geographical area which is geographically divided into a plurality of cells, each cell comprising a base unit and being assigned one of a plurality of communication channel groups employed in said cellular communication system, such that at least those of the communication channel groups which are assigned to adjacent ones of the cells are different from each other, wherein radio communication is performed between the base unit and a mobile unit moving in the geographical area, using a communication channel included in the one of the communication channel groups and a first transmission output level; and a fixed unit connected to a communication network via a wired line, wherein said mobile unit and said fixed unit comprise:

identification means for sequentially receiving communication channels included in the communication channel groups employed in said cellular communication system, and identifying, on the basis of the reception results, the one of the communication channel groups which is assigned to the one of the cells in which the mobile unit is situated;

storage means for selecting, on the basis of the identification results, those of the communication channel groups employed in said cellular communication system which are not assigned to the one of the cells at which the mobile unit is situated, and storing the selected communication channel groups; and means for performing radio communication between the mobile unit and the fixed unit, using a communication channel included in the communication channel groups stored in the storage means.

19. The mobile communication system according to claim 18, wherein said fixed unit is located in a cell of the cellular communication system and comprises:

a first receiving circuit configured to receive signals sent via the communication channels of the communication channel groups assigned to the cells of the cellular communication system;

a control circuit configured to determine whether communication channels of the communication channel groups other than the communication channel group assigned to the cell in which the fixed unit is located are available on the basis of the signals received by the first receiving circuit; and a second receiving circuit configured to receive a signal transmitted from the mobile unit via a communication channel determined to be available by the control circuit.

20. The mobile communication system according to claim 18, wherein said mobile unit comprises:

a receiving circuit configured to receive, in a first time period, a signal sent via a communication channel of the communication channel group of the cell in which the mobile unit is located, and receiving, in a second time period different from the first time period, a signal sent via a communication channel of one of the communication channel groups other than the communication channel group assigned to the cell in which the mobile unit is located; and a call reception detection circuit configured to detect a call coming via the base unit and a call coming via the fixed unit on the basis of the signals received by the receiving circuit.

21. The mobile communication system according to claim 18, wherein said mobile unit comprises:

an operation circuit configured to designate the base unit or the fixed unit as a destination of radio connection; and a radio communication circuit configured to selectively perform a radio communication operation with the base unit and a radio communication operation with the fixed unit in accordance with a designated content input by the operation circuit.

22. The mobile communication system according to claim 18, wherein said fixed unit is located in a cell of the cellular communication system and comprises:

a first receiving circuit configured to selectively receive signals sent via the communication channels of the communication channel groups assigned to the cells of the cellular communication system;

a control circuit configured to determine whether communication channels of the communication channel groups other than the communication channel group assigned to the cell in which the fixed unit is located are available on the basis of the signal received by the first receiving circuit; and a transmission circuit configured to transmit a signal to the mobile unit via a communication channel determined to be available by the control circuit; and said mobile unit comprises:

a receiving circuit configured to receive the signal from the fixed unit via the communication channel determined to be available by the control circuit of the fixed unit;

a mode setting circuit configured to set a cordless mode in a time period in which the signal transmitted to the mobile unit is received by the receiving circuit, and to set a cellular mode in another time period; and a radio communication circuit configured to selectively perform a radio communication operation with one of the base units and a radio communication operation with the fixed unit in accordance with the mode set by the mode setting circuit.

* * * * *